Figure 1:
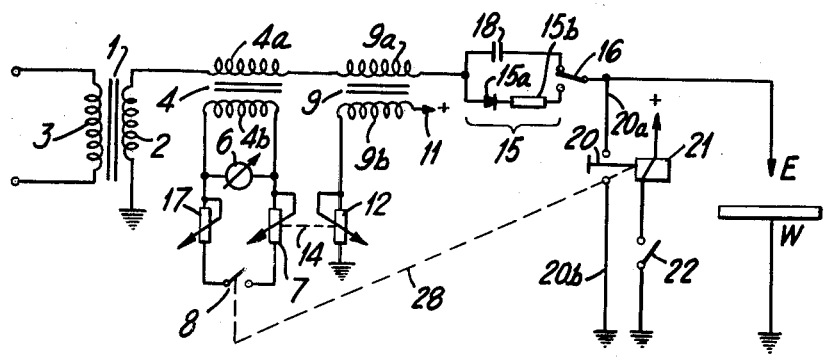

June 15, 1965 H. ULLI 3,189,724
ELECTRICAL WELDING APPARATUS
Filed April 22, 1963

INVENTOR.
HANS ULLI

United States Patent Office 3,189,724
Patented June 15, 1965

3,189,724
ELECTRICAL WELDING APPARATUS
Hans Ulli, Zurich, Switzerland, assignor to Verwaltungs-
gesellschaft der Werkzeugmaschinenfabrik Oerlikon,
Zurich, Switzerland, a Swiss firm
Filed Apr. 22, 1963, Ser. No. 274,464
Claims priority, application Switzerland, Apr. 27, 1962,
5,078/62
10 Claims. (Cl. 219—131)

This invention pertains, in general, to electrical welding apparatus; and, particularly, to apparatus for the performance of shielded arc welding wherein the welding current can be adjusted and measured.

In order to perform welding operations under an inert or protective gas atmosphere (i.e., the so-called shielded arc welding process), it is necessary that the welding current be adjusted to a predetermined value prior to initiating the welding operation. Such a preadjustment is especially required where thin-walled materials are to be welded to each other. Usually, it is particularly difficult to preadjust the welding current precisely to the required value if such welding apparatus is to be adapted to provide either direct or alternating welding current and if the apparatus is required to operate at different welding current levels. For example, if the apparatus is intended to operate at three different current levels, then at least two measuring instruments, each with three scales, have to be provided; i.e., three scales on one instrument have to be provided for the direct current levels and three scales on the other instrument have to be provided for the alternating current levels. Often, reading errors result when such a multiplicity of measuring instruments is employed. Also, with such prior art apparatus, temperature variations affecting the welding current adversely influence the resulting welds.

One object of the present invention is to provide new and improved welding apparatus.

Another object of the present invention is to provide shielded arc welding apparatus, wherein the magnitude of the welding current required may be preset prior to the initiation of the welding operation by adjusting a single instrument.

Another object of the present invention is to provide shielded arc welding apparatus which is simply constructed, relatively inexpensive and capable of being preadjusted easily so as to permit the achievement of predictable high quality welds.

A further object of the present invention is to provide a shielded arc electric welding apparatus wherein the welding current value, in one or more direct and alternating current ranges, can be adjusted to the desired value before the start of welding and by means of a single instrument.

Thereby, on the one hand, the danger of wrong readings, which is caused by multiple scales, is reduced and, on the other hand, due to the current adjustment in advance of starting the welding, the factors influencing the welding current, such as the inherent temperature of the system and possible deviations of line voltage from the nominal value, are automatically taken into consideration.

According to one embodiment of the shielded arc welding apparatus provided by the invention, there is provided a welding current adjustment element and a welding current measuring instrument. For the purpose of accurately preadjusting the welding current, there is provided, at the output or work cooperating side of the apparatus, switch means for loading or short circuiting to ground the welding current source. The welding current adjustment element is coupled with the welding current measuring device in such manner that, when said switch means is operated, the current level indicated by said measuring device, at each position of the current adjustment device, is substantially equal to the level of the welding current which will be delivered during the actual welding operation.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
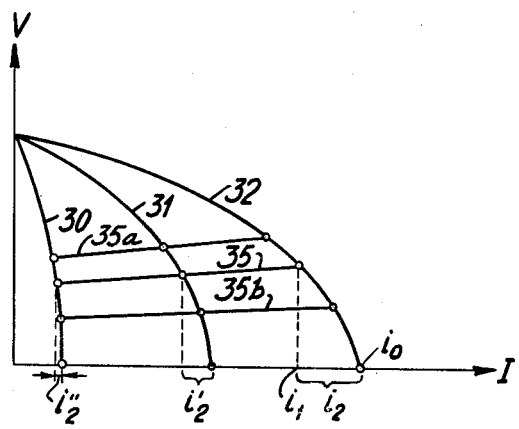

In the drawings:

FIG. 1 is an electrical schematic of the electrical welding apparatus according to the present invention; and FIG. 2 is a graphical representation of the welding arc voltage as a function of the welding current.

As illustrated in FIG. 1, there is provided a main transformer 1, having a primary winding 3 and a secondary winding 2. The primary winding 3 is adapted for being connected across a source of alternating supply voltage (not shown). As indicated, one side of the secondary winding 2 is grounded.

Connected in series with one side of the secondary winding 2 is the primary winding 4a of a control transformer 4. The control transformer 4 has a secondary winding 4b across which is connected the ammeter 6. Connected in parallel with the ammeter 6 and the secondary winding 4b is the series circuit comprising the two variable resistors 7 and 17 and the switch 8. When switch 8 is closed, the variable resistors 7 and 17, being parallelly connected with the ammeter 6, cause the ammeter 6 to register a lower current indication; the current indication of the ammeter 6 being decreased when switch 8 is closed corresponding to the pre-adjusted values of the resistors 7 and 17.

Also provided is a transductor 9, such as a saturable reactor having the primary, or power and secondary, or control, windings 9a and 9b, respectively. As shown, the primary winding 9a of the transductor is connected in series with the primary winding 4a of the control transformer 4. As shown, one side of the secondary winding 9b of the transductor 9 terminates in a terminal element 11. Terminal 11 is connected to the positive terminal of a battery designated generally by the + sign shown in FIG. 1. The other side of the secondary winding 9b is connected to ground through the intermediate variable resistor 12. The purpose of the transductor 9 is to adjust the level of the welding current. A mechanical linkage 14 interconnects the resistance varying elements of the variable resistors 7 and 12. For example, the variable resistors 7 and 12 may be potentiometers which have their wiper elements actuated by the rotation of a shaft common to both potentiometers.

Adjustment of variable resistor 12 varies or adjusts the direct current flow through secondary or control winding 9b. The greater the resistance value adjusted with resistance 12, the smaller will be the direct current flowing through the winding 9b, and the greater will be the alternating current resistance represented by primary or power winding 9a of the transductor or reactor 9. Conversely, the smaller the resistance adjusted with the resistance 12, the larger will be the direct current flowing through the control winding 9b and the smaller will be the alternating current resistance represented by the power winding 9a. As a consequence, the core of the transductor 9 becomes saturated and the primary winding 9a presents a very small resistance to the alternating current passing therethrough.

As illustrated at FIG. 1, a capacitor 18, or a current rectifying circuit designated generally by the reference numbers 15, may be connected in series with the primary winding 9a of the transductor 9 by operation of the single pole double-throw selector switch 16. With the switch 16 operated, as shown at FIG. 1, such that the capacitor 18 is in the circuit, only alternating current is delivered to the welding electrode E. However, when the switch 16 is transferred to the other fixed contact, the rectifying circuit 15 is connected in the circuit and direct current is supplied to the welding electrode E.

The rectifying circuit, designated generally by the reference number 15, is comprised of the diode 15a and the low-pass filter section 15b. While one diode element 15a is illustrated in FIG. 1, it is to be understood that a bank of such diodes may be employed in a manner well known.

As illustrated, the welding electrode E is directly connected in series with the switch 16. The workpiece W to be welded is connected to ground. As is known, when there is a suitable voltage developed between the electrode E and the grounded workpiece W, there will be developed an arc, the heat thereof being usable for fusing the parts of the workpiece W to be welded.

Connected between the switch 16 and ground are two conductor lengths 20a and 20b. As indicated, when a movable switch contact 20 is actuated, the conductors 20a and 20b will form a short circuit to ground for current at the switch 16, thus loading the welding source. The movable contact 20 is adapted to be actuated by energization of the coil 21 of a relay. One side of the relay coil 21 is connected to a source of positive potential, as indicated by the + sign. The other side of the relay coil 21 is adapted to be connected to ground potential whenever the single pole single-throw switch 22 is closed. A linkage, designated generally by the reference 28, may be employed so that when the relay coil 21 is energized, the switch contacts 20 and 8 may be operated in unison; i.e., the switch contacts 20 and 8 may be closed in unison or the switch contact 8 may open in unison with the closure of the switch contact 20.

The operation of the welding circuit of FIG. 1 may be best appreciated by reference to FIG. 2. In FIG. 2, there are illustrated three voltage vs. welding current characteristics of the welding circuit of FIG. 1. In FIG. 2, V denotes the voltage at electrode E, or, respectively, between the contacts of the open switch 20. Also, I designates the current flowing through either the closed switch 20, or when the latter is open, between the electrode E and work piece W. The three voltage vs. welding current curves 30, 31 and 32 occur at different settings of the variable resistor 12. The volt-current characteristic of the curve 30 corresponds to a very large resistance setting of the resistor 12. In this case the transductor 9 presents a relatively large alternating current resistance to the flow of welding current. In the volt-current characteristic shown by curve 32, the variable resistor 12 is set at a relatively small resistance value, whereby a relatively large current flows through the primary winding 9a of the transductor 9. The volt-current characteristic represented by the curve 31 corresponds to an intermediate or mean adjustment of the value of the variable resistor 12.

When the conductor lengths 20a and 20b, by virtue of closure of the switch contact 20, short circuit the switch 16 to ground, the voltage at the welding electrode E is substantially zero. Thus, at a welding electrode voltage of zero, the maximum welding currents which flow lie on the abscissa of the graph of FIG. 2.

It has been found that the characteristic load line occurring during welding is, generally, a straight line, as indicated by the reference number 35 in FIG. 2. Accordingly, the arc voltage-welding current conditions that actually occur during welding are those indicated by the intersection of the line 35 with the various characteristic curves 30, 31 and 32; the characteristic curves 30, 31 and 32 being the arc voltage vs. welding current generated by the circuit of FIG. 1 corresponding to different adjustment settings of the variable resistor 12.

When it is desired to preset the welding current to a desired value, the switch contact 20 is closed (it is assumed that switch 8 is opened) and the welding current is varied by adjusting the variable resistor 12. The welding current is registered on the ammeter 6. However, the value of current registered on the ammeter 6 does not correspond to the value of welding current which actually occurs during operation. This deviation can be seen in FIG. 2. For example, with respect to the characteristic curve 32, a maximum current $i_0$ will flow when switch 20 is closed, whereas, during actual welding, a current $i_1$ will flow. As shown in the graph of FIG. 2, there is a deviation between the current $i_0$ flowing, when switch 20 is closed, and the current $i_1$, flowing during actual welding, and this deviation is $i_2 = i_0 - i_1$. Similarly, when operating on the other characteristic curves 30 or 31, the current deviations $i''_2$ or $i'_2$ occur as indicated in the graph. Thus, although they are smaller, current deviations also occur when operating with the characteristic curves 31 and 30.

In order that the ammeter 6 may register, during the preadjustment period, the true current which will flow during the actual welding operation, there is provided the variable resistor 7 which, when switch 8 is closed, causes the ammeter 6 to indicate a smaller current than is actually flowing through the primary winding 4a of the transformer 4. The variable resistor 17 is for the purpose of adjusting the load line characteristic corresponding to the actual working condition of the apparatus. The variable resistor 7, being mechanically ganged with the variable resistor 12, is adjusted so that the current indicated on the ammeter 6, with switches 8 and 20 closed, is smaller than the true current flowing through the primary winding by an amount which corresponds exactly to the deviation current; for example, $i_2$ as shown in FIG. 2. Moreover, if during the period of preadjusting the welding circuit of FIG. 1 the variable resistor 12 is so adjusted that the operator changes from characteristic curve 32 to an intermediate current value on the characteristic curve 31, the variable resistor 7 will automatically be increased by virtue of the linkage 14 to compensate for the change from the deviation current $i_2$ to $i'_2$. The variable resistor 7 can have a linearly adjustable characteristic. For more precise current indications, however, it may have a non-linear characteristic.

After adjusting the variable resistors 7 and 12, and viewing the current indication on the ammeter 6, the switch 22 is opened thereby opening the switch contacts 20 and 8. Accordingly, during the welding operation thereafter, the welding current which actually occurs is readable, directly, from the ammeter 6. The welding current value read on the ammeter 6, during actual welding, corresponds substantially exactly to the current reading of the ammeter 6 during the preadjustment period.

The character of the load line is dependent upon the operating conditions; e.g., according to the type of protective gas used and also upon the composition of the covering material on the welding electrode E.

Other load line characteristics, such as 35a or 35b may be used. Load line characteristics, such as 35a or 35b may be selected by adjustment of the adjustable resistor 17. The resistance value to which the variable resistor 17 is adjusted prior to initiating the welding operation depends on the kind of protective gas employed, as well as on the material covering the electrode E. Appropriate resistance values depending upon the kind of gas and electrode covering used may be found in published handbooks.

The adjustment procedures hereinbefore described are independent of the position of the selector switch 16. Thus, the same preadjustment procedure is followed regardless of whether the welding current to be employed is direct current or alternating current.

A number of modifications to the circuitry of FIG. 1 may be employed without departing from the spirit and scope of the invention. For example, it is not indispensible that the switch contact 20 cause a short circuiting of the output of the apparatus. Instead, a limiting resistor may be placed in series with the switch contact 20. In addition, use of a transductor 9 is not indispensible. Instead, other adjustment means may be used. For example, a transformer with an adjustable core may be employed, or a choke coil with a movable yoke to vary the reactance of the welding circuit of FIG. 1. In each case, adjustment of the current value is associated with the correcting or compensating resistance 7 so that the indication of the measuring device 6 has a predetermined ratio to the pre-set current value or the adjusted welding characteristic or the apparatus.

While a specific embodiment of the invention has been shown and described in detail to illustrate the application of the principles of the invention, it will be understood that this invention may be embodied otherwise without departing from such principles.

What is claimed is:

1. Electric arc welding apparatus comprising, in combination, a source of A.C. potential; means connecting a workpiece to one terminal of said source; a transformer having a primary winding and a secondary winding; reactor means including a power winding and a control winding; a series welding circuit including the other terminal of said source, said primary winding, said power-winding, and an electrode operatively associated with the workpiece; an indicating meter connected across said secondary winding; a source of D.C. potential and a first adjustable impedance connected in series with said control winding to adjust the current flow therein to control the impedance of said power winding to control the current in said series welding circuit; a series control circuit, including a second adjustable impedance and a switch, connected in parallel with said meter; switch means connected across said electrode and the workpiece and effective, when closed, to short circuit said A.C. source; means interconnecting said switch and said switch means for conjoint closure; and means interconnecting said adjustable impedance for conjoint adjustment; said second adjustable impedance, upon closure of said switch and said switch means, shunting, around said meter, a current having a value substantially equal to the difference between the short circuit current through said switch means, when closed, and the actual welding current between said electrode and the workpiece, when said switch means is open, as adjusted by said first impedance; whereby upon closure of said switch means, prior to the start of welding, said meter will indicate the actual welding current as adjusted by said first impedance.

2. Apparatus according to claim 1, wherein additional circuit means are included in series between said electrode and said reactor means power winding; said additional circuit means comprising: a capacitor; a current rectifying circuit; and a selector switch, said selector switch being operable to place either said capacitor or said current rectifying circuit in series between said electrode and said reactor means power winding.

3. In electric arc welding apparatus of the type including a series welding circuit comprising a source of welding current, a workpiece, an electrode operatively associated with the workpiece, and current adjusting means, and further including current measuring means operatively coupled to said series welding circuit: means for pre-setting the actual welding current with reference to the current measuring means, said pre-setting means, comprising, in combination, first switch means connected across the electrode and the workpiece, and effective, when closed, to short circuit said welding current source; adjustable impedance means operable, when connected to the current measuring means, to reduce the current flow through the latter in accordance with the adjusted value of said adjustable impedance means; second switch means selectively operable to connect said adjustable impedance means in circuit relation with the current measuring means; means connecting said first and second switch means for conjoint closure; and means connecting said adjustable impedance means and the current adjusting means for conjoint operation in such manner that, upon conjoint closure of said first and second switch means prior to starting of a welding operation, said adjustable impedance means will reduce the current through the current measuring means by an amount equal to the differential between the short circuit current flowing in the series welding circuit, upon closure of said first switch means, and the actual welding current flowing in the series circuit when said first switch means is open and said electrode is in arcing relation with the workpiece; whereby, upon closure of said first switch means prior to the start of welding, the current measuring means will indicate the actual welding current as adjusted by the current adjusting means.

4. Apparatus according to claim 3, wherein said adjustable impedance means is a variable resistor connected in parallel with the welding current measuring means.

5. Apparatus according to claim 4, wherein said means conjointly interconnecting the welding current adjusting means and said variable resistor includes a mechanical linkage coupled between the welding current adjusting means and said variable resistor.

6. Apparatus according to claim 5, wherein there is included additional switch means operable for coupling said adjustable resistor with the welding current measuring means and additional linkage means coupling said additional switch means and said short circuiting switch means so that both said switch means operate in unison.

7. Apparatus according to claim 3, wherein the welding current adjusting means comprises a transductor including a variable resistance for adjusting the impedance of said transductor.

8. Apparatus according to claim 7, wheerin the current adjusting means comprises an adjustable resistor.

9. Apparatus according to claim 3, wherein the source of welding current is an alternating current source, and wherein additional circuit means are provided for supplying either alternating current or direct current to the electrode, the current measuring means and the current adjusting means being in the alternating current portion of said apparatus.

10. Apparatus according to claim 3, wherein said adjustable impedance means includes two variable resistors, one of which is adjustable for the purpose of presetting the load line characteristic of the welding apparatus.

References Cited by the Examiner

UNITED STATES PATENTS

| 1,979,944 | 11/34 | Kost | 219—131 |
| 2,464,679 | 3/49 | Fletcher et al. | 219—131 |
| 2,757,296 | 7/56 | Bichsel | 307—80 |
| 2,777,973 | 1/57 | Steele et al. | 315—171 |

FOREIGN PATENTS

| 517,770 | 2/31 | Germany. |
| 530,301 | 7/54 | Belgium. |

RICHARD M. WOOD, *Primary Examiner.*